United States Patent [19]

Lennartsson

[11] Patent Number: 4,868,890

[45] Date of Patent: Sep. 19, 1989

[54] DIVERSITY COMBINER

[75] Inventor: Back M. I. Lennartsson, Luxgatan, Sweden

[73] Assignee: Telefonaktiebolaget L M Ericsson, Stockholm, Sweden

[21] Appl. No.: 132,182

[22] Filed: Dec. 14, 1987

[30] Foreign Application Priority Data

Dec. 15, 1986 [SE] Sweden .................................. 8605387

[51] Int. Cl.⁴ ........................... H04B 1/06; H04B 7/08
[52] U.S. Cl. ..................................... 455/139; 455/137; 455/277; 455/273
[58] Field of Search ................ 455/132, 134, 137, 138, 455/139, 273, 275, 276, 277, 278, 285, 302–306; 375/100

[56] References Cited

U.S. PATENT DOCUMENTS

| 3,631,344 | 12/1971 | Greenwald | 455/137 |
| 4,210,871 | 7/1980 | Hill et al. | 455/137 |
| 4,633,519 | 12/1986 | Gotoh et al. | 455/277 |
| 4,696,058 | 9/1987 | Tachita et al. | 455/134 |

FOREIGN PATENT DOCUMENTS

| 0191538 | 11/1983 | Japan | 455/277 |
| 0232727 | 11/1985 | Japan | 455/277 |

Primary Examiner—Robert L. Griffin
Assistant Examiner—Ralph E. Smith
Attorney, Agent, or Firm—Burns, Doane, Swecker & Mathis

[57] ABSTRACT

A diversity combiner is provided for combining two received radio signals having the same frequency and modulation. For each of the radio signals (s, s') there is included a mixer (1, 1') with an associated voltage controlled local oscillator (2, 2') and a following intermediate frequency filter (3, 3') for generating an intermediate frequency signal (m, m') and a phase comparator (5, 5') for comparing the intermediate frequency signal with a reference signal (a) originating from a weighted aggregate (e) of the intermediate frequency signals (m, m). Each phase comparator (5, 5') sends a signal responsive to the phase difference and which controls the frequency of the local oscillator (2, 2'). The weights of the sub signals can be varied such that the quotient of the contribution of the sub-signals to the aggregate can be caused to correspond to an arbitrary power, which is greater than or equal to one, of a corresponding quotient before the addition. This is achieved by the aggregate being formed by a signal weighting and adding circuit (8), which includes four bipolar transistors, and which is controlled by two voltages (N, N') which are responsive to the logarithm of the amplitude of the intermediate frequency signals (m, m').

5 Claims, 2 Drawing Sheets

DIVERSITY COMBINER

TECHNICAL FIELD

A diversity combiner for combining two received radio signals having the same frequency and modulation, the combiner including for each of the radio signals a mixer with an associated voltage controlled local oscillator and a following intermediate frequency filter for generating an intermediate frequency signal, and a phase comparator for comparing the intermediate frequency signal with a reference signal and sending a signal responsive to the phase difference, said signal being utilized for controlling the local oscillator frequency, and where the reference signal originates from a weighted aggregate of the two intermediate frequency signals.

BACKGROUND ART

Two or more radio signals originating from a single transmitted radio signal and received by different antennae are combined in a diversity combiner. These signals are usually of mutually different amplitude and phase, and the task of the combiner is to form a combined resultant signal with a better signal-to-noise ratio than any of the individually received signals.

A diversity combiner of the kind given in the introduction is already known in essential respects, e.g. from the U.S. Pat. No. 3,631,344. A so-called "Ratio squared Predetection Combiner" is described in this publication. Two intermediate frequency sub-signals of like phase are formed from two incoming radio frequency signals. The two sub-signals are each filtered in their respective bandpass filter with a considerably greater bandwidth than that of the useful signal itself, so that additive noise in surrounding frequency bands are allowed to pass through the filter, as well as the useful signal. The combined signals thus obtained each pass through their respective amplifier provided with automatic gain control, whereby the noise amplitude of the signal from each amplifier will be inversely proportional to the amplitude of the useful signal. The signal from each amplifier is then divided into a useful signal part and a noise signal part with the aid of two filters. The filtered-out noise is detected and the noise level utilized to control the attenuation in a voltage controlled attenuator in the path of the useful signal. The output signals from the attenuators are added in an adding circuit, whereby a weighted aggregate signal is formed from the two intermediate frequency subsignals, the amplitude contribution from each sub-signal in this signal being proportional to the square of the amplitude of the respective sub-signal. The aggregate signal is used for detecting the radio signals and as a reference signal in the formation of the like-phase sub-signals. In a diversity combiner of this kind there is a risk, however, that disturbing radio signals, which have frequencies outside the passband of the filter that filters out the useful signals, pass through the other filters and affect the combiner function.

There are also diversity combiners in which the strongest signal is solely utilized, or in which the signals are added with the same weight (equal gain).

DISCLOSURE OF INVENTION

The object of the present invention is to provide a diversity combiner of the kind mentioned in the introduction, which forms two like-phase sub-signals from two radio signals, a weighted aggregate of the sub-signals being formed, and where the weighting of the sub-signals can be varied such that the quotient of the contribution of the sub-signals to the aggregate can be caused to correspond to an arbitrary power, which is greater or equal to one, of a corresponding quotient before addition. This is achieved by the aggregate being formed by a signal weighting and adding circuit, which includes four bipolar transistors, and which is controlled by two voltages responsive to the logarithm of the amplitude of the intermediate frequency signals. In this way there is also achieved that the function of the combiner is not affected by other radio signals on adjacent frequencies.

The characterizing features of the invention are disclosed in the accompanying claims.

BRIEF DESCRIPTION OF DRAWINGS

The invention will now be described in more detail, with reference to the drawings, on which

BEST MODE OF CARRYING OUT THE INVENTION

Figure 1:
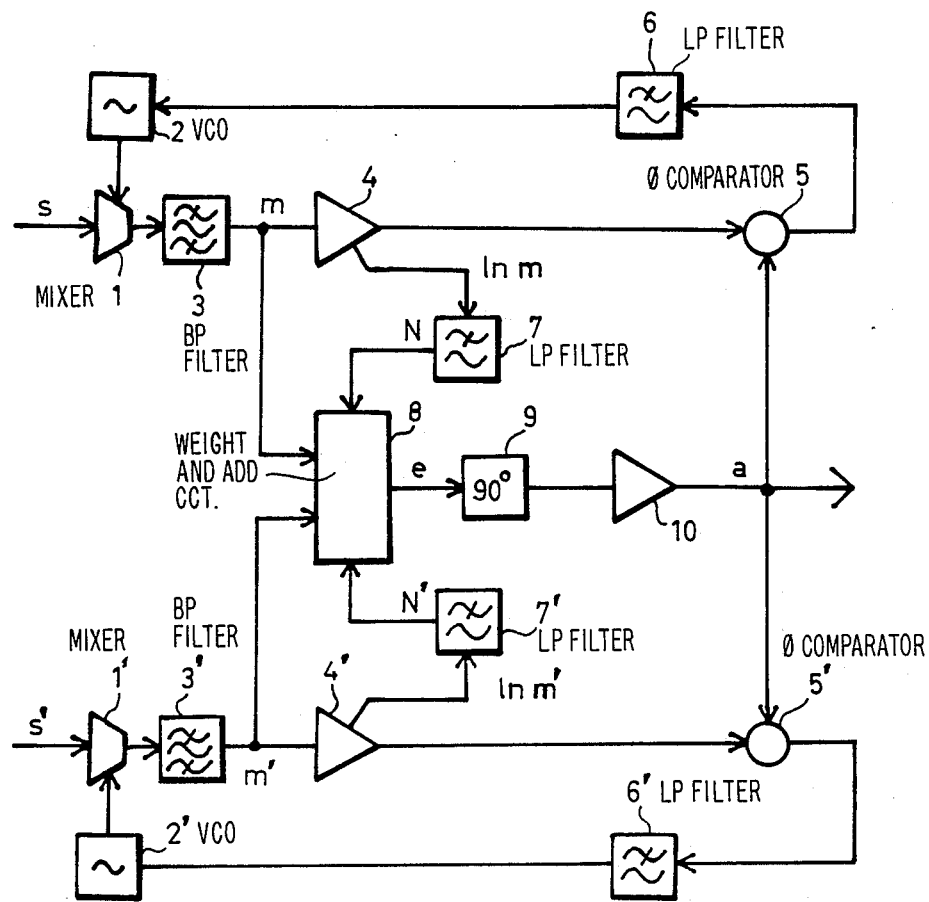
FIG. 1 is a block diagram of a diversity combiner in accordance with the invention.

An embodiment example of a diversity combiner is illustrated in FIG. 1. Means that have been provided with reference characters having prime signs agree with means provided with like reference characters without prime signs. An intermediate frequency signal is denoted by s. This is converted to a new intermediate frequency signal, m, with the aid of a phase-locked loop comprising a mixer 1, a voltage controlled local oscillator 2, an intermediate frequency filter 3 for filtering out the new intermediate frequency signal m, an amplitude restricting amplifier 4, a phase comparator 5 and a low-pass filter 6. The phase angle of the intermediate frequency signal from the filter 3 is compared in the phase comparator 5 with the phase angle of a reference signal ,a, common to both phase comparators 5, 5', this reference signal also being the output signal from the diversity combiner. The frequency and phase of the local oscillator 2 are acted on so that the signal from the filter 3 is forced to follow the phase angle of the reference signal a. Each of the amplifiers 4, 4' is also provided with a logarithmic amplitude detector, sending a voltage on its output proportional to the logarithm of the amplitude of the signal at the amplifier input. For the amplifier 4, this voltage is denoted In m. A voltage N is obtained after filtering in a lowpass filter 7. Both voltages N, N' are each supplied to its control input on a signal weighting and adding circuit 8. Both like-phase subsignals m,m' are supplied to two other inputs on the circuit 8, where they are combined to form a signal e, in a manner which is described in connection with FIG. 2. The signal e is phase-shifted 90° in a phase shifter 9, and then taken to an amplitude-restricting amplifier 10, which sends the reference signal a on its output. As will have been understood earlier, this signal is utilized, inter alia for detecting the information content of the radio signals. The reason for the 90° phase shift of the signal e is that this gives the phase comparator 5 a correct working point.

The amplitude restricting amplifier 4 with the logarithming amplitude detector and phase comparator 5 may be a single integrated circuit, e.g. of the type TDA 1576 (Philips), NE 605 (Signetics) or CA 3189 (RCA). Of course, the illustrated amplifier 4 may comprise a separate amplifier and a separate logarithming means.

Figure 2:
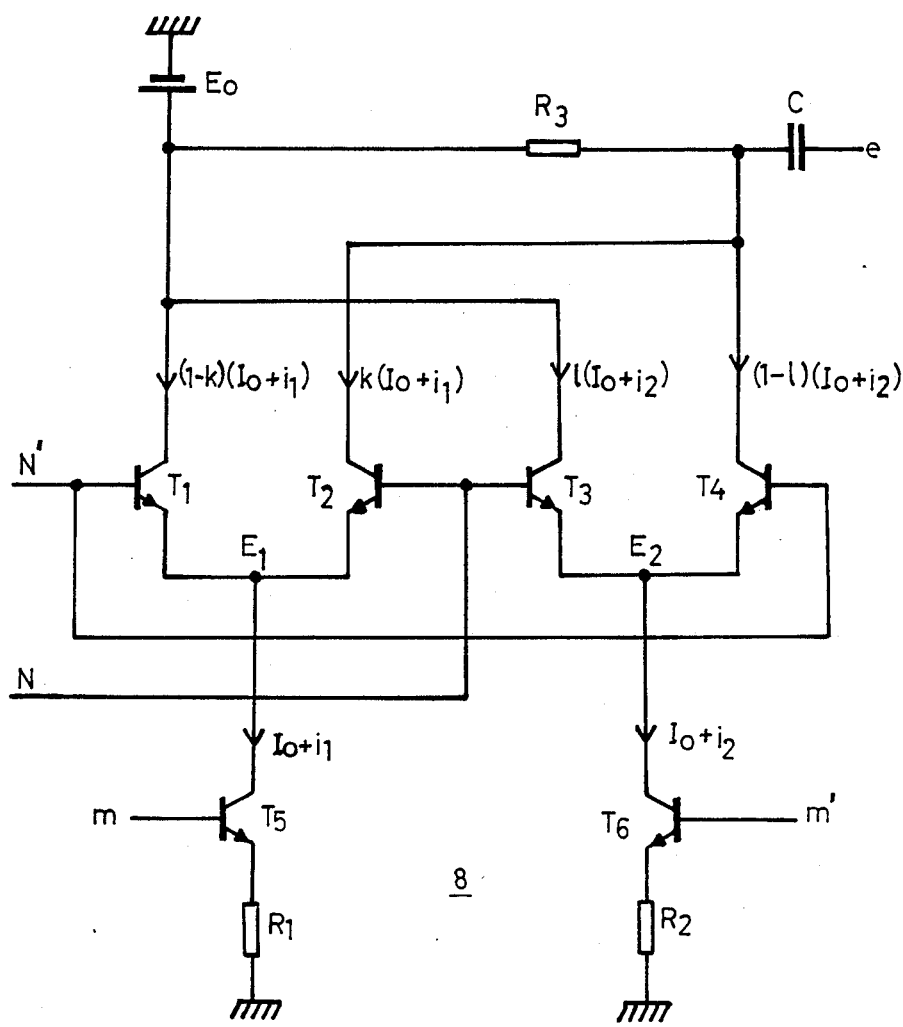
FIG. 2 is a wiring diagram of a signal weighting and adding circuit included in the diversity combiner of FIG. 1.

An example is illustrated in FIG. 2 of a wiring diagram for the signal-weighting and adding circuit 8 of FIG. 1. Four bipolar transistors are denoted $T_1$-$T_4$, and form two differential steps. The control voltage N is taken to the bases of the transistors $T_2$ and $T_3$, and N' is taken to the bases of $T_1$ and $T_4$. The sub-signals m and m' are each taken to their respective transconductance step, in which they are converted from small-signal voltages to small signal currents $i_1$ and $i_2$. The transconductance steps each consists of a transistor $T_5$ and $T_6$, and opposingly connecting emitter resistor $R_1$ and $R_2$. The latter have equally as great resistances, and the transistors $T_5$ and $T_6$ have working points with the same setting, and are therefore passed through by equally as great quiescent currents $I_0$. Accordingly, the transconductance steps have equally as great transconductance. The collectors of transistors $T_5$ and $T_6$ are connected to the emitters of transistors $T_1$, $T_2$ and $T_3$, $T_4$, respectively. The current $I_0 + i_1$ through $T_5$ is divided by the transistor pair $T_1$, $T_2$, the current $(1-k) \times (I_0+i_1)$ being assumed to flow through $T_1$ and the current $k \times (I_0+i_1)$ is assumed to flow through $T_2$. In a similar way, the current $I_0+i_2$ through $T_6$ is divided up by the transistor pair $T_3$, $T_4$ into a component $1 \times (I_0+i_2)$ through $T_3$ and a component $(1-l) \times (I_0+i_2)$ through $T_4$. The values of k and l may vary between zero and one. The transistors $T_1$ and $T_3$ are connected to a feed voltage source $E_0$, and the transistors $T_2$ and $T_4$ are connected to this voltage source via a load resistor $R_3$. The output signal e of the circuit is taken from a capacitor C connected to the load resistor $R_3$. The output signal is thus responsive to the small-signal currents through $T_2$ and $T_4$, but is not responsive to the small-signal currents through $T_1$ and $T_3$.

Circuits essentially of the kind formed by the transistors $T_1$-$T_4$ are already known per se, and are usually called Gilbert cells. It is known to use them in so-called balanced modulators and double-balanced converters.

The magnitudes k and l are responsive to the control voltage N and N'. For example, if N is considerably more positive than N', the transistors $T_2$ and $T_3$ will be turned on, while $T_1$ and $T_4$ will be turned off. In this case $k = 1 = 1$, and only $i_1$ contributes to the output voltage e. If N and N' are equal, the transistors $T_1$-$T_4$ will all be turned on equally. In this case $K = 1 = \frac{1}{2}$, and $i_1$ and $i_2$ contribute equally to the output signal. If N is considerably less positive than N', only $T_1$ and $T_4$ will be turned on. In this case $k = 1 = 0$, and only $i_2$ contributes to the voltage e.

Since N and N' are proportional to the logarithm of m and m', respectively, the following applies:

$$N = K_1 \times \ln m + K_2 \quad (1)$$

$$N' = K_1 \times \ln m' + K_2 \quad (2)$$

where $K_1$ and $K_2$ are selectable constants.

If the potentials on the emitter pairs of $T_1$, $T_2$ and $T_3$, $T_4$ are denoted $E_1$ and $E_2$ respectively, the following is applicable, according to Eber-Molls model for bipolar transistors:

$$k \times (I_0 + i_1) = I_0' \times \exp(K_3 \times (N - E_1)) \quad (3)$$

$$(1-k) \times (I_0 + i_1) = I_0' \times \exp(K_3 \times (N' - E_1)) \quad (4)$$

$$l \times (I_0 + i_2) = I_0' \exp(K_3 \times (N - E_2)) \quad (5)$$

$$(1-l) \times (I_0 + i_2) = I_0' \times \exp(K_3 \times (N' - E_2')) \quad (6)$$

where $I_0'$ is a constant for the selected transistory type, and $K_3$ is a natural constant.

Dividing (3) by (4) and (5) by (6) gives:

$$k/(1-k) = \exp(K_3 \times (N - N')) \quad (7)$$

$$l/(1-l) = \exp(K_3 \times (N - N')) \quad (8)$$

From (7) and (8) it is found that $k = 1$ \quad (9)

Applicable to the small-signal currents $i_1$ and $i_2$ is that:

$$i_1 = g \times m \quad (10)$$

$$i_2 = g \times m' \quad (11)$$

where g is the transductance of the transductance step.

The contributions of the sub-signals m and m' to the circuit output signal e are proportional to $k' i_1$ and $(1 \times l) \times i_2$, respectively. The quotient q of these contributions will therefore be:

$$k \times i_1/((1-l) \times i_2) \quad (12)$$

By inserting (7)–(11) in (12) there is obtained:

$$q = \exp(K_3 \times (N - N_1)) \times m/m' \quad (13)$$

By inserting (1) and (2) in (13) there is finally obtained:

$$q = (m/m')^{(1 + K_1 \times K_3)}$$

The combination of the logarithming characteristic of the amplifier 4 and the exponential characteristic of the transistors $T_1$-$T_4$ in the signal weighting and adding circuit 8 thus results in that the quotient of the sub-signal contributions to the voltage at the circuit output can be caused, by suitable dimensioning of the selectable constant $K_1$, to correspond to an arbitrary power, which is greater than or equal to one, of a corresponding quotient at the circuit input. For example, $K_1 = 0$ gives a combiner in which the sub-signals are added with the same weight (equal gain). If $K_1$ is selected so that $K_1 \times K_3 = 1$, the amplitude contribution from each sub-signal will be proportional to the square of the amplitude of the respective sub-signal (ratio-squared), If $K_1 \times K_3$ are much greater than one, the sub-signal which is stronger for the moment is mainly utilized.

Since detection of both amplitude and phase of the respective sub-signal is performed after it has passed the bandpass filter 3, 3', the combiner control signal will not be disturbed by radio signals on adjacent frequencies either.

The signal weighting and adding circuit 8 can be arranged alternatively, e.g. so that the collectors of the transistors $T_1$ and $T_3$ are connected to the resistor $R_3$ instead of those of the transistors $T_2$ and $T_4$, if the control voltages N and N' are changed over. In this case the contribution from the sub-signal m to the circuit output signal will still come from the transistor controlled by the voltage N and vice versa.

I claim:

1. A diversity combiner for combining two received radio signals having the same frequency and modulation, comprising:

a mixer for each of the radio signals; a voltage controlled oscillator connected to each mixer; an intermediate frequency filter connected to each mixer for generating an intermediate frequency signal; a phase comparator connected to each intermediate frequency filter for comparing the intermediate frequency signal with a reference signal and generating an output signal responsive to the phase difference for controlling the voltage controlled oscillator frequency; means for determining the logarithm of each intermediate frequency signal amplitude and for generating two respective control voltages in response to said logarithms; and a signal weighting and adding circuit common to the two radio signals for forming a weighted aggregate of the two intermediate frequency signals, said weighting and adding circuit including:

first and second pairs of bipolar transistors, one transistor in each pair receiving one of said two control voltages, and the other transistor in each pair receiving the other of the two control voltages;

a first converting means for converting one intermediate frequency signal to a first current and a second converting means for converting the other intermediate frequency signal to a second current, said first and second pairs of transistors being responsive to said control voltages to divide each of said first and second currents into first and second components such that the ratio between the first and second components of said first current is at least approximately equal to the corresponding ratio between the components of said second current; and a resistor for supplying both the component of said first current which passes through the transistor supplied with the control voltage originating from the same intermediate frequency signal as said first current and the component of said second current passing through the transistor supplied with the control voltage originating from the same intermediate frequency signal as said second current.

2. A combiner as claimed in claim 1, wherein the emitters of said first pair of transistors are connected together, and the emitters of the second pair of transistors are connected together.

3. A combiner as claimed in claim 2, wherein said first converting means is connected to the emitters of one pair of transistors, and the second converting means is connected to the emitters of the second pair of transistors.

4. A combiner as claimed in claim 1, wherein the converting means each includes a transconductance circuit, the circuits having equally as great transconductance, each circuit including a transistor with an emitter resistor.

5. A combiner as claimed in claim 1, wherein said means for generating control voltages each includes an amplifier for amplifying the intermediate frequency signal obtained from the intermediate frequency filter and generating a voltage which is responsive to the logarithm of the amplitude of the intermediate frequency signal.

* * * * *